(12) United States Patent
Ruehle et al.

(10) Patent No.: US 10,388,924 B2
(45) Date of Patent: Aug. 20, 2019

(54) CARRIER ASSEMBLY FOR CARRYING AND HOLDING COMPONENTS FOR BATTERY CELLS OF A BATTERY MODULE, IN PARTICULAR FOR AN ELECTRIC VEHICLE

(71) Applicant: Robert Bosch GmbH, Stuttgart (DE)

(72) Inventors: Andreas Ruehle, Bietigheim-Bissingen (DE); Marc Heydemann, Stuttgart (DE); Markus Hald, Jagstzell (DE); Ralf Angerbauer, Moeglingen (DE); Rene Deponte, Sersheim (DE); Philipp Berg, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 15/324,828

(22) PCT Filed: Jun. 9, 2015

(86) PCT No.: PCT/EP2015/062781
§ 371 (c)(1),
(2) Date: Jan. 9, 2017

(87) PCT Pub. No.: WO2016/005123
PCT Pub. Date: Jan. 14, 2016

(65) Prior Publication Data
US 2017/0200930 A1 Jul. 13, 2017

(30) Foreign Application Priority Data
Jul. 9, 2014 (DE) .................. 10 2014 213 275

(51) Int. Cl.
*H01M 10/42* (2006.01)
*H01M 10/48* (2006.01)
(Continued)

(52) U.S. Cl.
CPC ......... *H01M 2/1077* (2013.01); *H01M 2/043* (2013.01); *H01M 2/1264* (2013.01);
(Continued)

(58) Field of Classification Search
None
See application file for complete search history.

(56) References Cited

U.S. PATENT DOCUMENTS

2009/0181288 A1 7/2009 Sato
2013/0330579 A1* 12/2013 Ejiri .................... H01M 2/1061
429/53
(Continued)

FOREIGN PATENT DOCUMENTS

DE 102012203289 9/2012
DE 102011076981 12/2012
(Continued)

OTHER PUBLICATIONS

JP2014010984A—Machine translation (Year: 2014).*
(Continued)

*Primary Examiner* — Haroon S. Sheikh
(74) *Attorney, Agent, or Firm* — Michael Best & Friedrich LLP

(57) ABSTRACT

The invention relates to a carrier assembly (1) for carrying and holding components for battery cells of a battery module, in particular for an electric vehicle, said carrier assembly comprising a non-conductive main body (2) and a plurality of electrical connection elements (3) for electrically connecting the battery cells to one another, said electrical connection elements (3) being arranged on the main body (2). According to the invention, the carrier assembly (1) comprises a venting channel (4) for the discharge of gas being emitted from the battery cells, and at least one cell-monitoring unit (5) for monitoring at least one battery
(Continued)

cell. The invention also relates to a battery module comprising a carrier assembly (1) according to the invention.

19 Claims, 4 Drawing Sheets

(51) Int. Cl.
  *H01M 2/10* (2006.01)
  *H01M 2/12* (2006.01)
  *H01M 2/20* (2006.01)
  *H01M 2/04* (2006.01)
(52) U.S. Cl.
  CPC ......... *H01M 2/206* (2013.01); *H01M 10/425* (2013.01); *H01M 10/48* (2013.01); *H01M 2010/4271* (2013.01); *H01M 2220/20* (2013.01)

(56) References Cited

U.S. PATENT DOCUMENTS

2014/0120407 A1    5/2014  Hofer et al.
2015/0042158 A1    2/2015  Schmidt et al.
2015/0144409 A1*   5/2015  Fujii .................. B60L 11/1879
                                                          180/65.1
2015/0171405 A1*   6/2015  Lee ........................ H01M 2/24
                                                          429/89

FOREIGN PATENT DOCUMENTS

DE    102012015816         2/2014
JP    2010097722 A          4/2010
JP    2010205509 A          9/2010
JP    2014010984 A  *      1/2014  .............. H01M 2/20
JP    2015022965 A          2/2015
WO    2012133710 A1        10/2012

OTHER PUBLICATIONS

International Search Report for Application No. PCT/EP2015/062781 dated Sep. 24, 2015 (English Translation, 2 pages).

* cited by examiner

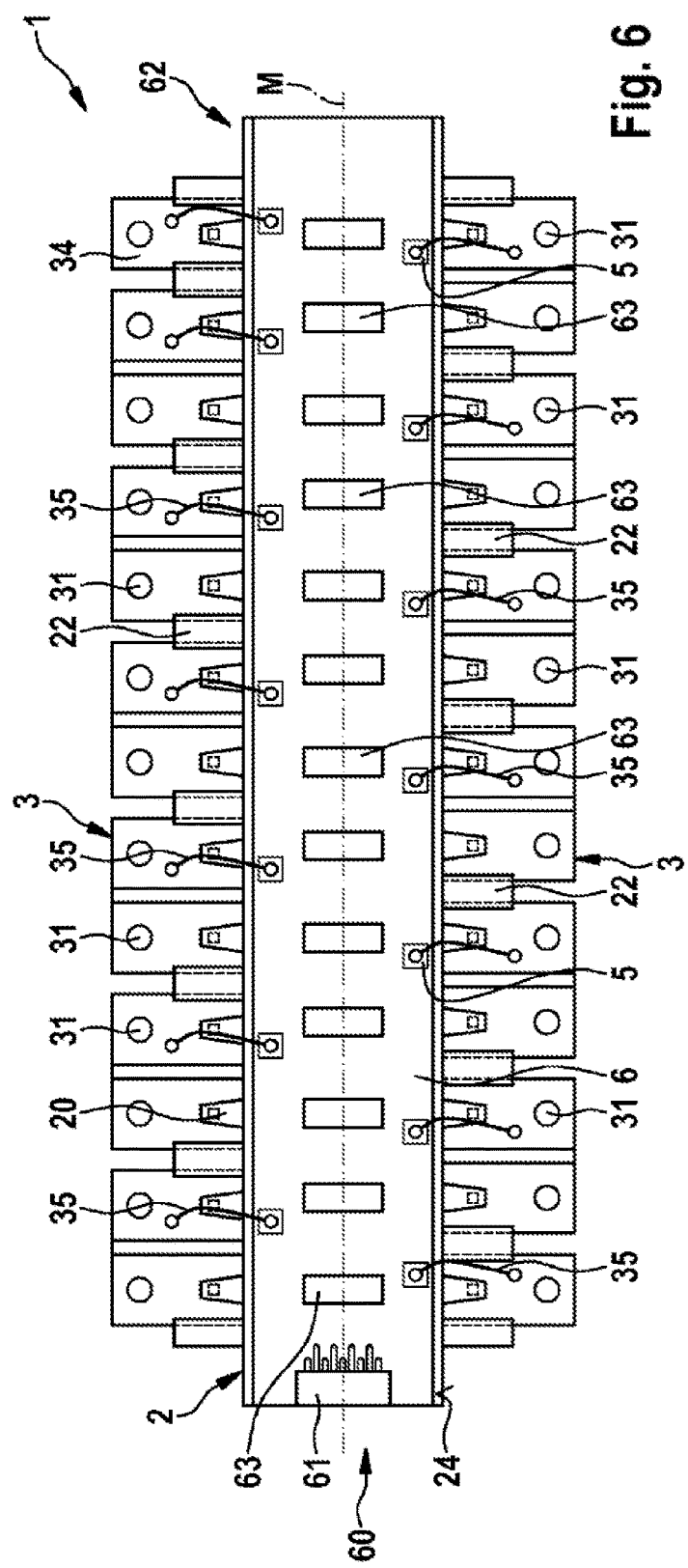
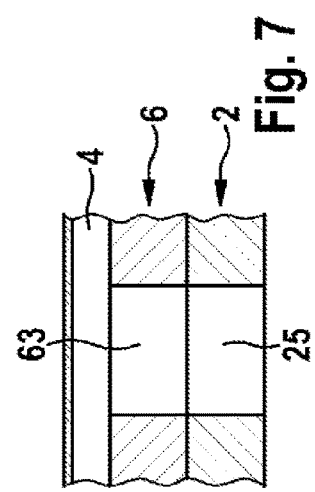

CARRIER ASSEMBLY FOR CARRYING AND HOLDING COMPONENTS FOR BATTERY CELLS OF A BATTERY MODULE, IN PARTICULAR FOR AN ELECTRIC VEHICLE

BACKGROUND OF THE INVENTION

The present invention relates to a carrier assembly for carrying and holding components of battery cells of a battery module, in particular for an electric vehicle. Furthermore, the present invention relates to a battery module which comprises a carrier assembly of this type.

A carrier assembly of this type is known, for example, from DE 10 2012 203 289 A1. This is a battery cover for a high voltage automotive battery, the battery cover comprising a non-conducting main body with a plurality of electrically conducting connectors which are coupled to the main body. Other components are usually connected electrically to the battery cells, such as cell monitoring units for monitoring the battery cells. However, the arrangement of components of this type in a battery module or a battery can be laborious and complicated, which can lead to a large amount of installation space and weight of the battery module or the battery. As a result, furthermore, high costs can be generated.

SUMMARY OF THE INVENTION

In contrast, the invention according to the invention has the advantage that the production process during the assembly of batteries and their components can be facilitated. According to the invention, this is achieved by virtue of the fact that a carrier assembly comprises a plurality of components of a battery. Therefore, the various components can be positioned in a defined position and connected electrically to one another in a few work steps, which minimizes the production complexity, saves time and therefore also entails a cost advantage. Moreover, the production of the carrier assembly according to the invention and/or a battery module can be automated. Since a battery, for example, of an electric vehicle has a plurality of battery modules and accordingly a plurality of carrier assemblies, the cost advantage of the carrier assembly according to the invention can be multiplied here. This therefore results in a considerable cost saving. Here, the carrier assembly comprises a non-conducting main body, and a multiplicity of electrical connecting elements for electrically connecting the battery cells to one another, the electrical connecting elements being arranged on the main body, a degasification channel for discharging gas which exits from the battery cells, and at least one cell monitoring unit for monitoring at least one battery cell. Since the main body assumes a carrying function of the carrier assembly, the electrical connecting elements can be optimized for conducting current. Therefore, further weight can be saved. A battery module is to be understood to mean a module which is configured from a multiplicity of battery cells which are connected to one another in series or in parallel.

The electrical connecting elements are preferably arranged on both sides with respect to a center axis of the main body. The arranging of the electrical connecting elements can therefore take place quickly, by it being possible for the automation of the method to be simplified.

The main body can further preferably have fastening means, by means of which the electrical connecting elements are fastened to the main body in a positively locking and/or non-positive manner. As a result, the electrical connecting elements can be fastened to the main body in a simple way depending on the application.

The fastening means of the main body can advantageously have projections and the electrical connecting elements can have recesses, the projections of the fastening means being in engagement with the recesses of the electrical connecting elements. Here, the fastening means can preferably be configured as latching webs which have projections such as latching hooks and/or latching lugs and/or clip connections and/or integral hinges. Said projections engage into the corresponding recesses of the connecting elements which can comprise, for example, bores and/or beveled edges and/or grooves. As a result, the electrical connecting elements can be arranged on the main body in a simple and secure way depending on the application.

Furthermore, it is proposed that, furthermore, the main body preferably has insulation devices for insulating the electrical connecting elements. Therefore, electrical connecting elements can be insulated from one another depending on the requirements, as a result of which, for example, a short circuit can be avoided between adjacent battery cells. Reliable functioning of the battery cells can be ensured by way of the insulation of the electrical connecting elements.

In order to provide an improved arrangement and orientation of the electrical connecting elements on the main body, the insulation devices can preferably have grooves for guiding and holding the electrical connecting elements.

According to a further advantageous refinement of the present invention, the electrical connecting elements can be arranged on the main body in such a way that the electrical connecting elements are accessible from at least one side, preferably two sides. Therefore, electrical connecting of the electrical connecting elements to the battery cells and the cell monitoring unit can take place in a simple way. The electrical connecting elements are preferably of plate-shaped configuration and are arranged as projections on the main body, both flat sides of the connecting elements being accessible.

Furthermore, it is advantageous if the carrier assembly comprises, furthermore, a printed circuit board, on which the cell monitoring unit is arranged. As a result of the provision of a printed circuit board, cell monitoring units from different manufacturers can be used in the carrier assembly according to the invention, without it being necessary to modify the construction of the carrier assembly.

The main body can further preferably be of plate-shaped configuration, it being possible for the printed circuit board to be arranged on a first surface of the main body. Therefore, a compact and flat construction of the carrier assembly can be made possible. Moreover, a plate-shaped main body affords the advantage of rapid and inexpensive production. The printed circuit board can be fastened on the first surface of the main body, for example, with the aid of plastic clips or plastic hooks and/or by way of a joining method such as adhesive bonding or staking.

Furthermore, the degasification channel can preferably be arranged on the printed circuit board. As a result, an even more compact carrier assembly can be provided, it being possible for the carrier assembly to be of layered configuration.

The carrier assembly can particularly preferably have a multiplicity of cell monitoring units, each of the cell monitoring units being set up to monitor a battery cell. According to the invention, a collective plug for connecting the cell monitoring units to a battery management system can be provided at a first end of the printed circuit board. Each battery cell can be monitored individually and autonomously as a result of the provision of a plurality of cell monitoring units, each cell monitoring unit being assigned to a single battery cell. The collective plug serves to provide a common electrical connecting interface between the cell monitoring units and a battery management system. Even in the case of a single cell monitoring unit, the collective plug can collect signals of the individual battery cells which are detected via the cell monitoring unit and can transmit them to a battery management system.

It is also advantageous if, furthermore, the carrier assembly comprises a battery management system which is arranged on the printed circuit board. As a result, for example, homogeneous ageing of the battery can be made possible, by the battery cells being switched on and switched off in a targeted manner which is based on signals which are detected via the cell monitoring units. Therefore, the battery cells and/or the battery module can be protected, for example, against deep discharging and overheating. It is conceivable here that the battery management system can be integrated with the cell monitoring units in a single unit. Furthermore, a compact pre-assembled structural unit can be made possible by way of the arrangement of the battery management system on the printed circuit board, which structural unit can be inserted simply and rapidly into a battery module.

An outlet stub can particularly preferably be arranged at a second end of the printed circuit board on the degasification channel in order to discharge the gas which exits from the battery cells. Therefore, the gas which exits from all the battery cells of a battery module can be transported away through a common outlet.

The main body can preferably have first openings and the printed circuit board can have second openings, which openings are flow-connected to one another, the first openings being set up to receive the gas which exits from the battery cells. According to the invention, the second openings are flow-connected to the degasification channel. Therefore, a discharge section which is as short as possible can be made possible for the gas, as a result of which additional lines can be dispensed with. This results firstly in a rapid discharge of the gas which is produced by the battery cells and secondly in lower production complexity. If the battery cells are provided with rupture valves, the first openings of the main body are arranged in such a way that the first openings expose the rupture valves.

Here, the first openings and the second openings can preferably be configured as slots. Therefore, a large quantity of gas can be discharged rapidly. The slots can preferably be distributed uniformly over an entire length of the main body, a longitudinal axis of each slot preferably being perpendicular with respect to the center axis of the main body.

Furthermore, the main body can preferably be configured from plastic. As a result, the main body and the carrier assembly have a high flexibility. Therefore, a possible offset which can occur as a result of tolerances and inherent movements of the battery cells can be compensated for.

According to one advantageous design of the carrier assembly according to the invention, furthermore, the carrier assembly can have a module end terminal which is arranged on the main body and serves to electrically connect the battery module to other battery modules.

The cell monitoring unit or the multiplicity of cell monitoring units can advantageously be connected to the electrical connecting elements and/or the module end terminal by means of bond wires. Here, the bond wires can be welded on the electrical connecting elements and/or the module end terminal.

A sheet metal part can further preferably be provided on a second surface of the main body. Therefore, an emitted gas jet can be deflected in the case of thermal runaway of one or more battery cells. The sheet metal part can be configured, for example, as a baffle plate part made from metal.

Furthermore, the present invention relates to a battery module which comprises a carrier assembly according to the invention. The advantages which are mentioned above in relation to the carrier assembly are associated with this. Here, one carrier assembly per battery module can preferably be used.

A further aspect of the present invention relates to an electric battery and an electric vehicle which comprise a carrier assembly according to the invention or battery module according to the invention. Therefore, a higher number of batteries can be used in the electric vehicle as a result of the compact construction of the carrier assembly and the battery, which can lead to a higher power output.

BRIEF DESCRIPTION OF THE DRAWINGS

In the following text, one preferred exemplary embodiment of the invention will be described in detail with reference to the accompanying drawing, in which:

FIG. 6 shows a diagrammatic, greatly simplified view of the carrier assembly shown in FIG. 1, in a second step of its production method or assembly method, and FIG. 7 shows a diagrammatic, greatly simplified sectional view of a part of the carrier assembly, a layered construction of the carrier assembly being shown.

DETAILED DESCRIPTION

In the following text, a carrier assembly 1 according to one preferred exemplary embodiment of the present invention will be described in detail with reference to FIGS. 1 to 6.

Figure 1:
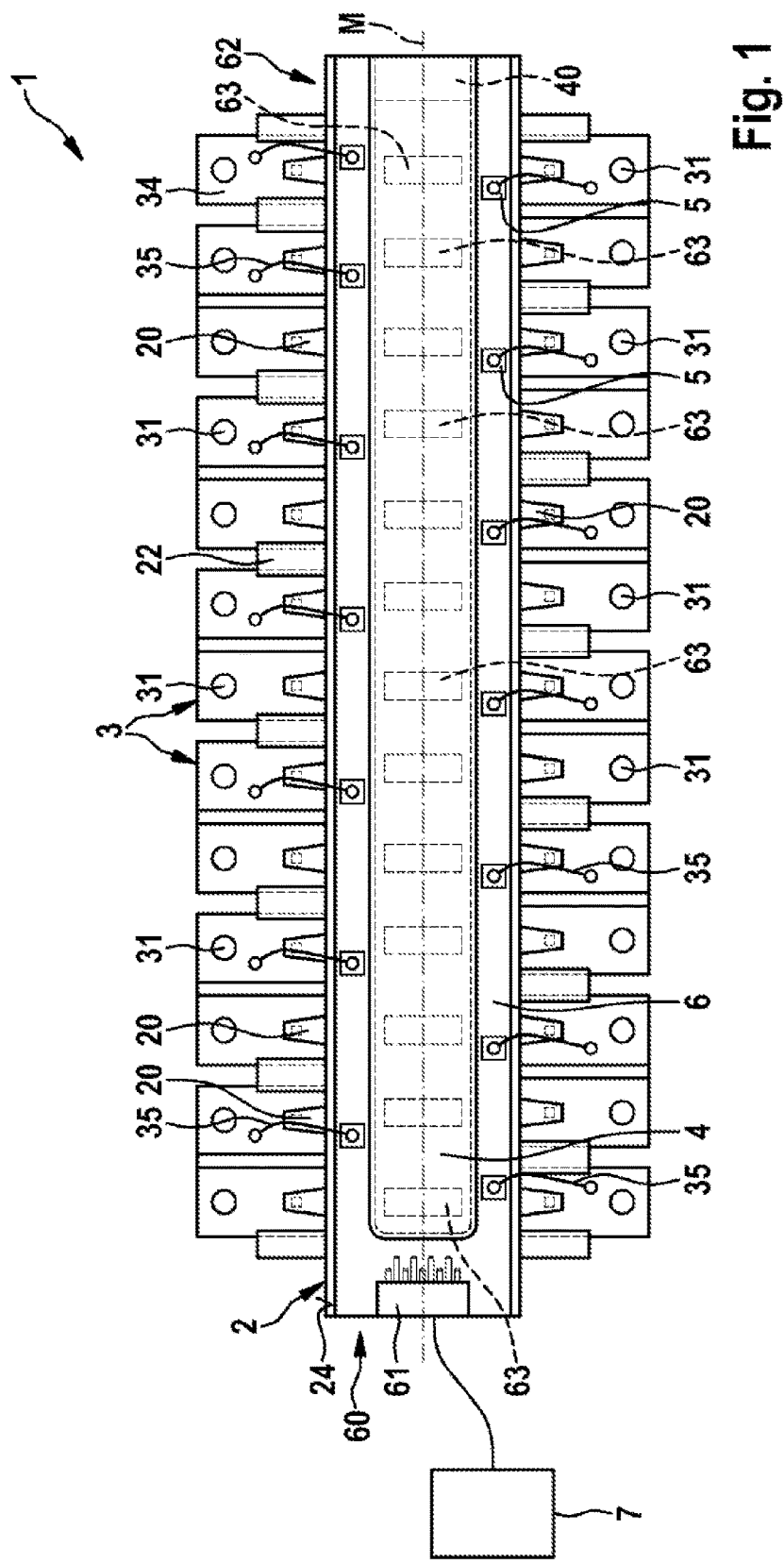
FIG. 1 shows a diagrammatic, greatly simplified view of a carrier assembly according to one preferred exemplary embodiment of the present invention.

As can be seen from FIG. 1, the carrier assembly 1 according to the invention comprises a non-conducting main body 2 and a multiplicity of electrical connecting elements 3 for electrically connecting battery cells (not shown) to one another.

According to the invention, furthermore, the carrier assembly 1 has a degasification channel 4 for discharging gas which exits from the battery cells and a multiplicity of cell monitoring units 5 for monitoring the battery cells. Here, each of the cell monitoring units 5 is set up to monitor a battery cell.

Figure 2:
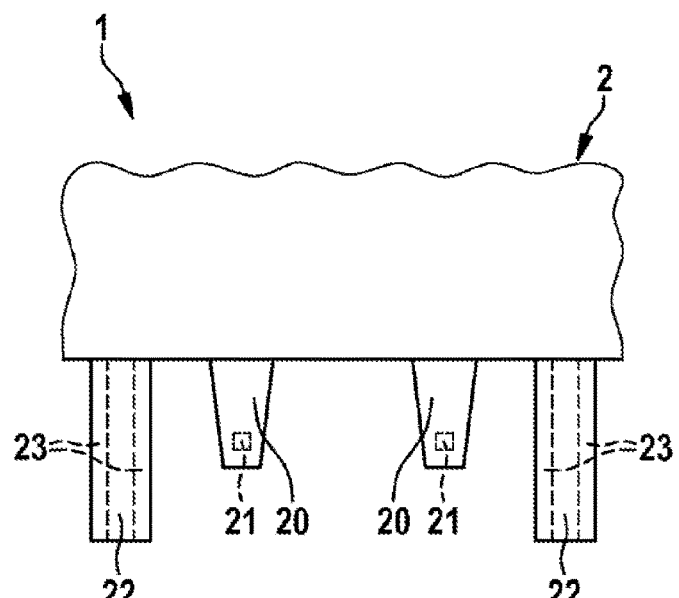
FIG. 2 shows a diagrammatic, greatly simplified plan view of a part of a main body of the carrier assembly which is shown in FIG. 1, two fastening means and two insulation devices being shown.
Figure 3:
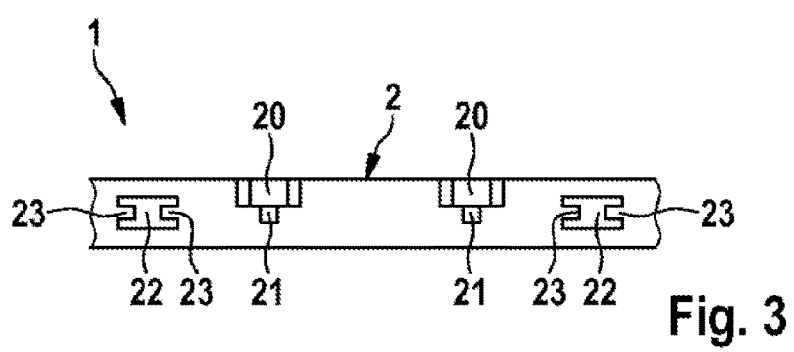
FIG. 3 shows a diagrammatic, greatly simplified view of the part of the main body of the carrier assembly shown in FIG. 2, from below.
Figure 4:
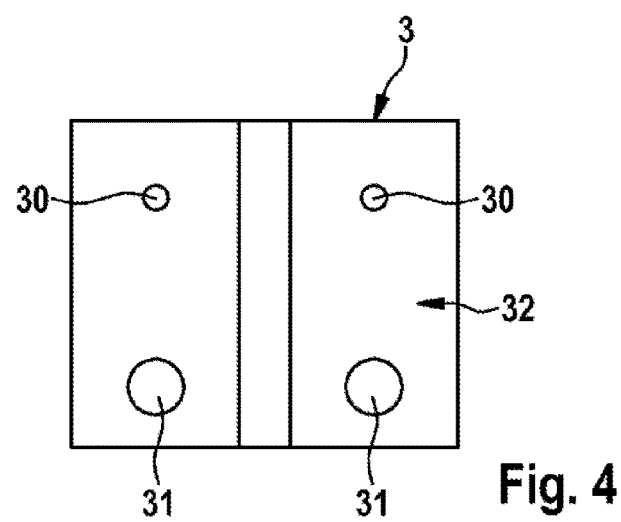
FIG. 4 shows a diagrammatic, greatly simplified plan view of an electrical connecting element which is fastened to the carrier assembly via the fastening means from FIGS. 2 and 3.

The main body 2 which is of plate-shaped configuration has a multiplicity of fastening means 20 which are configured as latching webs and by means of which the electrical connecting elements 3 are fastened to the main body 2 in a positively locking and a non-positive manner. In particular, the fastening means 20 are provided with projections 21 and the electrical connecting elements 3 are provided with first recesses 30 (FIGS. 2 to 4). The projections 21 of the fastening means 20 are in engagement with the recesses 30 of the electrical connecting elements 3. In said exemplary embodiment, the projections 21 are configured as latching hooks and the first recesses 30 are configured as through holes. As an alternative, the projections 21 can be configured as latching lugs, clip connections or integral hinges, and the recesses 30 can be configured as beveled edges or grooves.

Furthermore, the electrical connecting elements 3 are arranged on both sides with respect to a center axis M of the main body 2 and are distributed uniformly in the direction of the center axis M over the entire main body 2 (FIG. 1). Moreover, the electrical connecting elements 3 have second recesses 31 which are likewise configured as through bores and via which the battery cells (not shown) are connected (FIG. 4).

The electrical connecting elements 3 are configured as sheet metal parts in said exemplary embodiment. Furthermore, the electrical connecting elements 3 are accessible from a first flat side 32 (upper side) and a second flat side (underside) for simpler electrical contact establishment between the battery cells (FIG. 1). In the view of FIG. 4, only the first flat side 32 of the electrical connecting element 3 is visible. The second flat side (underside) lies parallel to the first flat side 32 in a direction which lies perpendicularly on the sheet plane.

Furthermore, in order to insulate adjoining electrical connecting elements 3 and to avoid short circuits between adjacent electrical connecting elements 3, the main body 2 has insulation devices 22 which are configured as webs. In addition to their insulation function, the insulation devices 22 have grooves 23 for guiding and holding the electrical connecting elements 3 (FIGS. 2 and 3).

Furthermore, the carrier assembly 1 comprises a printed circuit board 6 which is arranged on a surface 24 of the main body 2 and on which the cell monitoring units 5 are arranged. The connecting between the cell monitoring units 5 and the battery cells takes place via bond wires 35 which connect the electrical connecting elements 3 to the printed circuit board 6.

The degasification channel 4 is arranged on the printed circuit board 6. In order to conduct the gas which exits from the battery cells into the degasification channel 4, the main body 2 has first openings 25 and the printed circuit board 6 has second openings 63 (FIG. 7). The first openings 25 of the main body and the second openings 63 of the printed circuit board 6 are oriented toward one another and are flow-connected to one another. Furthermore, the first openings 25 are set up to receive the gas which exits from the battery cells. Furthermore, the second openings 63 are flow-connected to the degasification channel 4.

A collective plug 61 for collecting data which are detected via the cell monitoring units 5 about the respective state of the battery cells is arranged at a first end 60 of the printed circuit board 6. Furthermore, the collective plug 61 is connected to a battery management system 7, to which the detected data are transmitted.

An outlet stub 40 is arranged at a second end 62 of the printed circuit board 6 at the degasification channel 4 for discharging the gas which exits from the battery cells. Furthermore, a module end terminal 34 is arranged at the second end 62 of the printed circuit board 6 on the main body 2 for electrically connecting the battery module to other battery modules (not shown).

Figure 5:
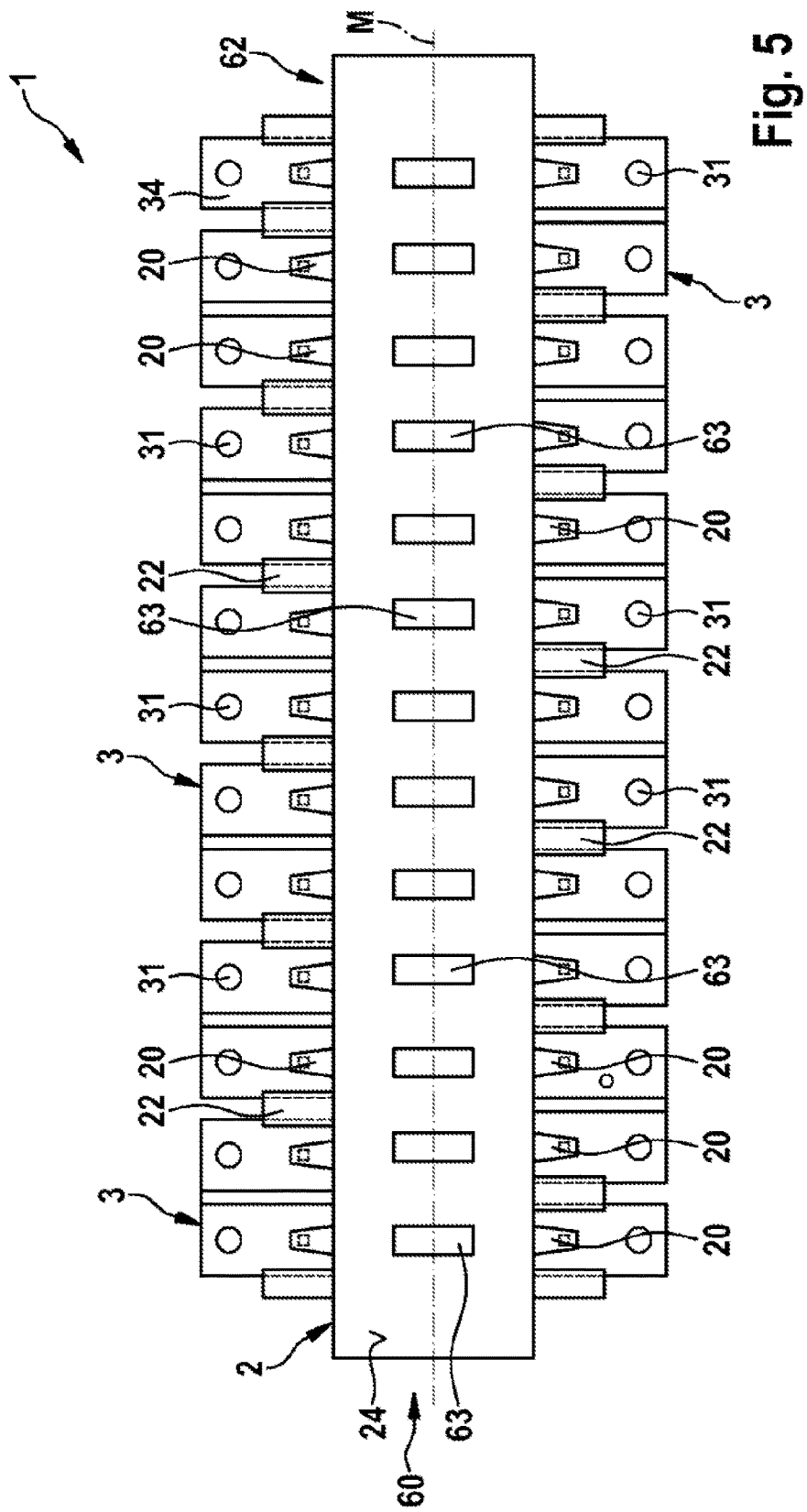
FIG. 5 shows a diagrammatic, greatly simplified view of the carrier assembly shown in FIG. 1, in a first step of its production method or assembly method.

In the following text, a production method or assembly method of the above-described carrier assembly 1 according to the invention will be described with reference to FIGS. 1, 5 and 6.

In a first step (FIG. 5), the electrical connecting elements 3 are fastened by means of the fastening means 20 of the main body 2 to the main body 2 which is manufactured, for example, by means of injection molding. In a second step (FIG. 6), the printed circuit board 6 is arranged on the surface 24 of the main body 2 and the cell monitoring units 5 are arranged on the printed circuit board 6. Following this, electrical connecting of the printed circuit board 6 to the electrical connecting elements 3 and the module end terminal 34 takes place by means of the bond wires 35. In a last step, the degasification channel 4 is fastened on the printed circuit board 6, for example by way of a joining method such as adhesive bonding or screwing, which results in the carrier assembly 1 from FIG. 1. As a result, the carrier assembly has a flat and compact construction.

The production complexity can be reduced by way of the carrier assembly 1 according to the invention, it also being possible for a layered construction of the carrier assembly 1 to be made possible. Furthermore, the carrier assembly according to the invention can be inserted into a battery module or replaced rapidly and simply as a preassembled structural unit.

Furthermore, the carrier assembly 1 according to the invention has a modular construction, with the result that rapid and simple adaptation of the carrier assembly 1 to different requirement profiles, for example different vehicle manufacturers, is also possible, for example, by way of exchanging the printed circuit board 6 or the electrical connecting elements 3.

What is claimed is:

1. A carrier assembly for carrying and holding components for battery cells of a battery module, comprising:
    a non-conducting main body (2),
    a multiplicity of electrical connecting elements (3) for electrically connecting the battery cells to one another, the electrical connecting elements (3) being arranged on the main body (2), wherein the main body (2) has insulation devices (22) for insulating the electrical connecting elements (3), each of the insulation devices (22) having grooves (23) for guiding and holding the electrical connecting elements (3), and wherein the grooves (23) of the insulation device (22) are positioned on opposite faces of the insulation device (22), each of the grooves (23) to guide and hold one of the connection elements (3),
    a degasification channel (4) for discharging gas which exits from the battery cells, and
    at least one cell monitoring unit (5) for monitoring at least one battery cell.

2. The carrier assembly as claimed in claim 1, characterized in that the electrical connecting elements (3) are arranged on both sides with respect to a center axis (M) of the main body (2).

3. The carrier assembly as claimed in claim 1, characterized in that the main body (2) has fastening means (20) by which the electrical connecting elements (3) are fastened to the main body (2) in a positively locking and/or non-positive manner.

4. The carrier assembly as claimed in claim 3, characterized in that the fastening means (20) have projections (21) and the electrical connecting elements (3) have recesses (30), the projections (21) of the fastening means (20) being in engagement with the recesses (30) of the electrical connecting elements (3).

5. The carrier assembly as claimed in claim 1, characterized in that the electrical connecting elements (3) are arranged on the main body (2) in such a way that the electrical connecting elements (3) are accessible from at least one side (32).

6. The carrier assembly as claimed in claim 1, comprising, furthermore, a printed circuit board (6) on which the cell monitoring unit (5) is arranged.

7. The carrier assembly as claimed in claim 1, characterized in that the main body (2) is of plate-shaped configuration, and in that the printed circuit board (6) is arranged on a surface (24) of the main body (2).

8. The carrier assembly as claimed in claim 6, characterized in that the degasification channel (4) is arranged on the printed circuit board (6).

9. The carrier assembly as claimed in claim 6, characterized by a multiplicity of cell monitoring units (5), each of the cell monitoring units (5) being set up to monitor a battery cell, and a collective plug (61) for connecting the cell monitoring units (5) to a battery management system (7) being provided at a first end (60) of the printed circuit board (6).

10. The carrier assembly as claimed in claim 6, comprising, furthermore, a battery management system (7) which is arranged on the printed circuit board (6).

11. The carrier assembly as claimed in claim 6, characterized in that an outlet stub (40) is arranged at an end (62) of the printed circuit board (6) on the degasification channel (4) in order to discharge the gas which exits from the battery cells.

12. The carrier assembly as claimed in claim 7, characterized in that the main body (2) has first openings (25) and the printed circuit board (6) has second openings (63), the first and second openings (25, 63) are flow-connected to one another, the first openings (25) being configured to receive the gas which exits from the battery cells, and the second openings (63) being flow-connected to the degasification channel (4).

13. The carrier assembly as claimed in claim 9, characterized in that an outlet stub (40) is arranged at a second end (62) of the printed circuit board (6) on the degasification channel (4) in order to discharge the gas which exits from the battery cells.

14. The carrier assembly as claimed in claim 1, characterized in that the electrical connecting elements (3) are arranged on the main body (2) in such a way that the electrical connecting elements (3) are accessible from two sides (32, 33).

15. The carrier assembly as claimed in claim 1, wherein each of the grooves (23) of the insulation devices (22) receives an edge of one of the connection elements (3).

16. The carrier assembly as claimed in claim 1, wherein the fastening means (20) include a protrusion in engagement with a recess of the connecting element and the fastening means are positioned between opposing grooves of the insulation devices (22) on either side of the connecting element.

17. The carrier assembly as claimed in claim 1, wherein the insulation device (22) is a rectangular prism with a groove (23) cut out of at least one face of the insulation device (22), wherein the groove (23) is in the shape of a rectangular prism.

18. A battery module, comprising a carrier assembly (1) as claimed in claim 1.

19. A carrier assembly for carrying and holding components for battery cells of a battery module, comprising:
    a non-conducting main body (2),
    a multiplicity of electrical connecting elements (3) for electrically connecting the battery cells to one another, the electrical connecting elements (3) being arranged on the main body (2), wherein the main body (2) has insulation devices (22) for insulating the electrical connecting elements (3), each of the insulation devices (22) having grooves (23) for guiding and holding the electrical connecting elements (3), and wherein the insulation devices (22) are connected to the main body (2) at a first end of the insulation device (22) such that a second end of the insulation device (22) extends from the main body (2),
    a degasification channel (4) for discharging gas which exits from the battery cells, and
    at least one cell monitoring unit (5) for monitoring at least one battery cell.

* * * * *